Patented Mar. 3, 1936

2,033,092

UNITED STATES PATENT OFFICE 2,033,092

SOAP FORMING COMPOUNDS AND PROCESS OF MAKING SAME

Herman A. Bruson, Philadelphia, Pa., assignor, by mesne assignments, to Röhm & Haas Company, Philadelphia, Pa., a corporation of Delaware No Drawing. Application December 23, 1933, Serial No. 703,839

19 Claims. (Cl. 260—130)

This invention relates to new soap-like, wetting or emulsifying agents and to a process for making same.

More particularly it relates to new phenolic derivatives which dissolve in dilute aqueous solutions of organic and inorganic acids to produce very foamy, stable, soapy solutions having a low surface tension and slippery feel. They are useful as detergents or as wetting agents in dyeing, laundering and bleaching operations, or as bactericides of low surface tension in acidic media.

According to this invention, certain nuclear substituted phenols of the type hereinafter described are condensed with formaldehyde, and a strongly basic, non-aromatic secondary amine containing less than seven carbon atoms to form a basic material which upon treatment with a water-soluble acid, forms a salt possessing the desired soap-like characteristics herein mentioned.

The phenols which are used for the purpose of this invention possess the general formula

X—R—OH wherein R is an aromatic monocyclic or polycyclic nucleus having at least one free nuclear position ortho to the phenolic hydroxyl group available for condensation; and X is a nuclear substituent of R, and may be any monovalent hydrocarbon radical containing more than three carbon atoms. It is understood herein that the aromatic nucleus R may contain other nuclear substituents in addition to X, such as additional hydroxyl groups, halogen atoms or, alkyl, alkoxy, nitro, amino, or methylol groups; but R should be free from acidic or acid forming substituents such as sulfonic, aldehydo, or carboxyl groups the presence of which prevents the desired condensation from taking place. The hydrocarbon group X is a monovalent aromatic, or hydroaromatic radical, or an aliphatic radical containing more than three carbon atoms. Phenols such as butylphenol, butylbromphenol, butylcresol, butylchlorphenol, butylresorcinol, butyliodophenol, butylnaphthol and their respective higher homologues such as the corresponding amyl-, hexyl-, heptyl-, octyl-, duodecyl-, hexadecyl-, or octa-decylphenols and the corresponding cresols, hydroquinones, resorcinols, and naphthols are particularly suitable for the present process. The alkyl groups in all of these phenols can be either straight-chain or branched-chain in character and may be in either the ortho, meta, or para position to the phenolic hydroxyl group, provided a free position ortho to the phenolic hydroxyl group remains available for condensation. Furthermore phenols such as cyclohexylphenol, bornylphenol, tetrahydronaphthylphenol, phenylphenol, benzylphenol and their corresponding cresol, resorcinol, hydroquinone, or naphthol analogues can be used.

Phenols, however, which contain no nuclear substituents of more than three carbon atoms such as phenol itself, cresols, xylenols, ethylphenol, isopropylphenol, thymol, carvacrol, resorcinol, naphthol, nitrophenol, chlorphenol, chlorcresol and the like do not yield foamy soapy acidic solutions which are the object of this invention, when condensed with formaldehyde and secondary amines by known methods, and such phenols, therefore, are useless for the purpose of the present invention. It is only when the phenols contain the proper nuclear hydrocarbon substituents i. e. those with more than three carbon atoms (and preferably six or more) that the typical properties of soaps begin to appear in acid solutions.

In general the best products, that is those giving the foamiest, soapiest solutions in dilute aqueous acids are obtainable by the present process from the monocyclic, monohydric phenols having a nuclear aliphatic hydrocarbon side-chain of from eight to eighteen carbon atoms in size. This sidechain can be either straight or branched in character.

The strongly basic, non-aromatic, secondary amines which can be used in the present process are preferably those which are soluble in water and possess less than a total of seven carbon atoms, such as dimethylamine, diethylamine, methylethylamine, di-isopropylamine, di-n-propylamine, diethanolamine, piperidine, piperazine and similarly constituted secondary amines. Aromatic secondary amines such as diphenylamine, dibenzylamine, N-monomethylaniline as well as secondary amines which contain acid forming or other harmful groups such as carboxyl, nitrile, primary amine, or sulfonic acid groups are inoperative to condense in the desired manner and are therefore useless for the purpose of the present invention.

In practicing this invention, reacting proportions of the phenol X—R—OH, as described herein, formaldehyde, and the secondary amine are mixed together preferably in the presence of an inert solvent, such as alcohol, ether, dioxane, or benzol, or other neutral solvent, and allowed to stand at ordinary room temperature, in which case they will ordinarily have reacted within twenty-four hours; or the mixture may be heated at or below the boiling point of the mixture under reflux, or in a closed vessel. Alternatively, the secondary amine can first be reacted with the formaldehyde, which reaction occurs immediately with evolution of heat upon mixing the two together, and the phenol X—R—OH then added thereto. The proportions of formaldehyde and the secondary amine used should be at least one mol. of each per mol. of the phenol used. An excess of formaldehyde or of the secondary amine can also be used. The reaction products may be isolated by evaporating off the solvent and low boiling impurities from the desired residual material or else by distillation of the latter in vacuo. In some cases the reaction product crystallizes out directly and can be filtered off, washed, dried and purified if desired. For use as soaps these reaction products are mixed with acids such as acetic, phosphoric, lactic, or gluconic; or in some cases with oxalic, sulfuric, hydrochloric, or hydrofluoric acids. These soapy solutions are stable to boiling. In some cases the salts thus obtained can be isolated as hygroscopic syrups or resins upon concentrating these soapy solutions by evaporating to remove the water.

*Example 1*

To a solution of 25 grams p-tertiary butylphenol in 30 cc. 95% ethyl alcohol there was added 33.3 grams of 30% aqueous formaldehyde solution and while cooling and stirring, 36.5 grams of a 41% aqueous solution of commercial dimethylamine added. The mixture was then heated under reflux while stirring at 80° C. for five hours. On cooling, two layers formed. The oil layer was separated and evaporated on a steam bath to remove volatile impurities. The product obtained was a reddish yellow oil. It dissolved readily in 10% aqueous hydrochloric or 4% sulfuric acid solutions to give a foamy soapy solution of low surface tension. In place of the p-tertiary-butylphenol one can use an equivalent quantity of p-tertiary-amylphenol, p-benzylphenol, or p-cyclohexylphenol. In each case a viscous oil is obtained which when dissolved in dilute acetic acid gives a foamy soapy solution. The dimethylamine can be replaced by an equivalent amount of diethylamine to yield similar products.

*Example 2*

(a) To a solution of 34 grams o-phenylphenol in 85 cc. 95% ethyl alcohol, there was added 22 grams of 30% aqueous formaldehyde solution and then while cooling, 22 grams of aqueous 41% dimethylamine solution. A clear solution was obtained which upon standing separated into two layers. The oil layer was separated and distilled in vacuo. It came over at about 145–180° C. at 4 mm. as a pale yellow oil which upon standing crystallized. Upon recrystallization from 95% alcohol it melted at 112–113° C. Its solution in dilute phosphoric acid was foamy, but not quite to the same degree as the products of Example 1.

(b) To a suspension of 34 grams p-phenylphenol in 85 cc. 95% ethyl alcohol, there was added 22 grams of 30% aqueous formaldehyde solution and 22 grams 41% aqueous dimethylamine solution. After standing several hours, the p-phenylphenol dissolved completely and in about six hours, the new reaction product began to separate as a crystalline mass. It melted at 90° C. upon recrystallization from 95% alcohol. Its solution in 10% phosphoric acid solution was very foamy and soapy.

*Example 3*

To a solution of 41.2 grams α,α,γ,γ,-tetramethyl-butylphenol,

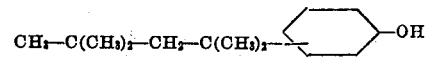

(such as is obtained by condensing phenol with di-isobutylene and sulfuric acid, see Niederl et al., Journ. Amer. Chem. Soc. 55, 2571 (1933), in 100 cc. 95% ethyl alcohol, there was added 20 grams aqueous 30% formaldehyde while cooling and stirring, and then 17.8 grams of piperidine (93% purity) was slowly added. After standing forty-eight hours at room temperature (25–30° C.) a crystalline mass had formed. Upon recrystallization from 95% ethyl alcohol it melted at 69° C. Its solutions in dilute lactic or acetic acid are very soapy and foam when shaken.

*Example 4*

(a) To a solution of 103 grams α,α,γ,γ,-tetra-methyl-butylphenol (0.5 mol.) in 100 cc. 95% ethyl alcohol there was added 50 grams 30% aqueous formaldehyde (0.5 mol.) and then while cooling and shaking 56 grams 41% aqueous di-methylamine solution (0.5 mol.) were gradually added. The mixture was allowed to stand for twenty-four hours at room temperature. Two layers formed. The oily layer was drawn off. Upon standing it rapidly crystallized to a solid mass. The product was readily soluble in dilute aqueous acetic, lactic, gluconic, hydrofluoric, formic, or phosphoric acid solutions to give very foamy soapy solutions of low surface tension. Upon recrystallization from 95% alcohol, the above crystal mass separated as colorless crystals having a melting point of 69° C.

(b) To a solution of 1 mol. α,α,γ,γ,-tetra-methyl-butylphenol (206 grams) in 500 cc. of 95% alcohol there was added 2 mols of formaldehyde (30% solution) and 2 mols of dimethylamine (41% solution). The mixture was heated at 80° C. under reflux while stirring for eight hours. The product was then distilled first at ordinary pressure to remove alcohol and volatile impurities, and finally in vacuo. A pale yellow viscous oil boiling at about 150–160° C. at 10 m. m. was obtained. It was readily soluble in dilute hydrochloric, acetic, or sulfuric acids to give extremely foamy soapy solutions. Upon refractionation the oil boiled at 157–160° C. at 3 m. m. The hydrochloride or the sulfate of this oil formed a colorless, transparent resinous syrup which is very hygroscopic and soapy.

(c) To 103 grams α,α,γ,γ,-tetramethyl-butyl-phenol in 100 cc. 95% alcohol, there was added 50 grams 30% formaldehyde, and 36.6 grams diethylamine were then added while cooling. The solution gradually separated into two layers. After standing for 96 hours at room temperature, the oily layer was drawn off, washed thoroughly with hot water and dried. It formed a thick pale yellowish syrup, readily soluble in dilute phosphoric or acetic acid to give a very foamy soapy solution.

(d) To a solution of 51.5 grams α,α,γ,γ,-tetramethyl-butylphenol in 50 cc. 95% alcohol, there was added 50 grams 30% formaldehyde and 55 grams diethanolamine. The clear solution was heated at 60–65° C. under reflux for four hours. The product was then poured into about 1 liter of water and the heavy oil separated. This oil could not be distilled without resinification. Its solutions in dilute acetic or lactic acid were very soapy and foamy.

*Example 5*

(a) To 26 grams of the duodecylphenols (mixture of

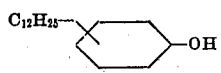

isomers boiling at 142–171° C./4 m. m. which is a crystalline mass obtained by condensing phenol with tri-isobutylene and sulfuric acid) there was added 50 cc. of 95% alcohol, 10 grams of 30% formaldehyde solution and 11 grams of 41% aqueous dimethylamine solution. The mixture was allowed to stand forty-eight hours. The alcohol and volatile impurities were then distilled off on a boiling water bath in vacuo. The residue was a pale yellow oil which dissolved readily in 10% phosphoric acid to give a very foamy, soapy solution.

(b) Instead of using the duodecylphenols, a mixture of hexadecylphenol

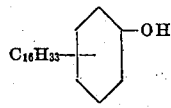

isomers boiling at 120–165° C./2 m. m. (which is a crystalline mass obtained by condensing phenol with tetra-isobutylene of boiling range 224–259° C. in the presence of concentrated sulfuric acid) was used as in (a) in equivalent molecular proportions. The product obtained was a pale reddish oil which in dilute acetic acid gave a very foamy, soapy solution.

(c) In place of the duodecylphenols of Example 6 (a) 26 grams of laurylphenol (obtained by condensing lauryl alcohol with phenol and zinc chloride) was used. The product obtained on condensation with formaldehyde and dimethylamine was soluble in dilute acetic acid to give a very foamy, soapy solution.

(d) In place of the hexadecylphenol of Example 6 (b) an equivalent quantity of the cetylphenol (made by condensing cetyl alcohol with phenol and zinc chloride) was used. The product obtained on condensation with formaldehyde and dimethylamine was soluble in dilute lactic acid to give a very foamy, soapy solution.

*Example 6*

To 220 grams of α,α,γ,γ,-tetramethylbutyl-p-cresol such as is obtained by condensing 1 mol. p-cresol with 1 mol. of di-isobutylene in presence of concentrated sulfuric acid and which boils at 115–119° C./2 m. m. there was added 500 cc. alcohol and 31 grams of para-formaldehyde, and dimethylamine gas was bubbled in until the increase in weight amounted to 50 grams. The mixture was allowed to stand twenty-four hours, then warmed one hour at 70° C. The product obtained upon removing the alcohol was readily soluble in dilute acetic acid to form a soapy, foamy solution.

*Example 7*

(a) To 22.2 grams of α,α,γ,γ,-tetramethylbutyl-resorcinol such as is obtained by condensing resorcinol with di-isobutylene and sulfuric acid (Niederl, J. Am. Chem. Soc. 55, 2574 (1933)) there was added 50 cc. alcohol, 10 grams 30% formaldehyde solution and 11 grams 41% aqueous dimethylamine solution. The mixture was warmed at 50° C. for five hours. Upon evaporation of the alcohol under reduced pressure a red viscous oil was obtained which dissolved in dilute phosphoric or acetic acid to give a very foamy solution.

(b) In place of the α,α,γ,γ,-tetramethylbutyl-resorcinol, 19.4 grams of n-hexylresorcinol was used. The product obtained upon condensation with the formaldehyde and dimethylamine dissolved readily in 10% phosphoric acid to give a very foamy, soapy solution.

The above examples illustrate the preferred method of the process herein set forth. The phenols used can be replaced mol. for mol. by any of the other nuclear substituted phenols or naphthols specified as operative herein so long as they contain at least one position ortho to the phenolic OH group available for condensation. The secondary amines used in the examples can be replaced by equivalent molecular quantities of the other secondary amines herein specified as operative. Temperatures higher or lower than those specified can also be employed, and the use of solvents can be dispensed with if thorough mixing is accomplished by other means, such as by rapid stirring or heating or both.

The products combine not only with water-soluble acids to form water-soluble salts which behave as soaps, but are also capable of combining with water-insoluble acids such as the higher fatty acids or the naphthenic or resin acids. Oil-soluble or hydrocarbon-soluble salts are thus obtained which can be used as emulsifying agents and as waxes, materials, and plasticizers in the plastic arts, as ingredients in compounding rubber, as intermediates for dyestuffs, and other purposes.

In practicing this invention it is not necessary that the phenols or the amines used be pure, as crude mixtures thereof can be used. Olefines of more than three carbon atoms such as butylenes, amylenes, hexenes, octenes, tri-isobutylene, tetraisobutylenediamylene and higher homologues as obtained from petroleum cracking can be condensed with phenol or its homologues by means of sulfuric acid and the crude alkylphenols thus obtained neutralized with alkali to destroy the sulfuric acid after which the formaldehyde and the secondary amine are added. In this manner very cheap soap-forming bases can be obtained without actually isolating the initial alkylphenols in pure form.

It is obvious that wide deviations in temperature and choice of the reactants given is possible. It is essential that the reactants remain neutral or alkaline during the condensation in order to obtain a proper reaction product. Traces of alkali such as sodium carbonate or sodium hydroxide may be added in some cases to increase the yield.

The foamy soapy aqueous acidic solutions of the bases made as set forth herein may be used as fat-splitting catalysts, emulsifying agents, germicides, and soaps.

In the following claims it is understood that the phenols mentioned do not contain any deleterious groups such as sulfonic, carboxyl, aldehydo or other acidic or acid forming groups and that the secondary amines are also free of similar groups and of primary amino groups.

The products obtained are capable of being converted into salts by treatment with organic halides such as benzyl chloride, or ethyl chloroformate, or with organic sulfates such as dimethyl sulfate to yield more or less syrupy to solid masses whose aqueous or acidified solutions are likewise very foamy and soapy in character.

From their chemical behavior as described above, it is believed that the phenolic bases obtained herein by condensation of formaldehyde with the secondary amines and nuclear alkylated phenols having more than three carbon atoms in the alkyl group, are tertiary amines which in their simplest forms possess the general structure

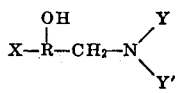

wherein R is an aromatic nucleus, X is the monovalent hydrocarbon substituent of R containing more than 3 carbon atoms, and Y and Y¹ are each alkyl groups, hydroxyalkylene groups, or jointly ring methylene groups, it being understood that one or two

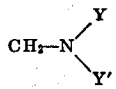

groups may be present depending upon the nature of the phenol and amine, as well as on the amounts of the formaldehyde and amine used.

What I claim is:—

1. A process for preparing bases, the salts of which have soap-like properties, comprising reacting on a phenol with at least an equimolecular amount of formaldehyde and at least an equimolecular amount of a strongly basic nonaromatic secondary amine containing less than seven carbon atoms, said phenol having the general formula X—R—OH in which R is an aromatic nucleus having at least one nuclear position ortho to a phenolic hydroxyl group available for condensation, and X is a monovalent hydrocarbon substituent of R, containing more than three carbon atoms.

2. A process for preparing bases, the salts of which have soap-like properties, comprising reacting on a phenol with at least an equimolecular amount of formaldehyde and at least an equimolecular amount of a strongly basic non-aromatic secondary amine containing less than seven carbon atoms, said phenol having the general formula X—R—OH in which R is an aromatic nucleus having at least one nuclear position ortho to a phenolic hydroxyl group available for condensation, and X is a monovalent hydrocarbon substituent of R, and is one of the group consisting of aliphatic radicals containing more than five carbon atoms, aromatic and hydroaromatic radicals.

3. A process for preparing bases, the salts of which have soap-like properties, comprising reacting on a phenol with at least an equimolecular amount of formaldehyde and at least an equimolecular amount of one of the group consisting of dimethylamine, diethylamine, methylethylamine, dipropylamine, di-isopropylamine, diethanolamine, piperidine, and piperazine, said phenol having the general formula X—R—OH in which R is an aromatic nucleus having at least one nuclear position ortho to a phenolic hydroxyl group available for condensation, and X is a monovalent hydrocarbon substituent of R, containing more than three carbon atoms.

4. A process for preparing bases, the salts of which have soap-like properties, comprising reacting on a phenol with at least an equimolecular amount of formaldehyde and at least an equimolecular amount of a strongly basic non-aromatic secondary amine containing less than seven carbon atoms, said phenol having the general formula X—R—OH in which R is an aromatic nucleus having at least one nuclear position ortho to a phenolic hydroxyl group available for condensation, and X is a monovalent aliphatic hydrocarbon substituent of R, containing from six to eighteen carbon atoms.

5. A process for preparing bases, the salts of which have soap-like properties, comprising reacting on a monocyclic phenol with at least an equimolecular amount of formaldehyde and at least an equimolecular amount of a strongly basic non-aromatic secondary amine containing less than seven carbon atoms, said monocyclic phenol having the general formula X—R—OH in which R is a phenyl group having at least one nuclear position ortho to a phenolic hydroxyl group available for condensation, and X is a monovalent hydrocarbon substituent of R, containing more than three carbon atoms.

6. A process for preparing bases, the salts of which have soap-like properties, comprising reacting on a phenol with at least an equimolecular amount of formaldehyde and at least an equimolecular amount of dimethylamine, said phenol having the general formula X—R—OH in which R is an aromatic nucleus having at least one nuclear position ortho to a phenolic hydroxyl group available for condensation, and X is a monovalent hydrocarbon substituent of R, containing more than three carbon atoms.

7. A process for preparing bases, the salts of which have soap-like properties, comprising reacting on a phenol with at least an equimolecular amount of formaldehyde and at least an equimolecular amount of dimethylamine, said phenol having the general formula X—R—OH in which R is an aromatic nucleus having at least one nuclear position ortho to a phenolic hydroxyl group available for condensation, and X is a monovalent hydrocarbon substituent of R, and is one of the group consisting of aliphatic hydrocarbon radicals containing more than three carbon atoms, aromatic and hydroaromatic hydrocarbon radicals.

8. A process for preparing bases, the salts of which have soap-like properties, comprising reacting on a phenol with at least an equimolecular amount of formaldehyde and at least an equimolecular amount of dimethylamine, said phenol having the general formula X—R—OH in which R is an aromatic nucleus having at least one nuclear position ortho to a phenolic hydroxyl group available for condensation, and X is a monovalent aliphatic hydrocarbon substituent of R having from four to eighteen carbon atoms.

9. A process for preparing bases, the salts of which have soap-like properties, comprising condensing olefins having more than three carbon atoms with phenols having a plurality of nuclear reactive positions available for substitution, in the presence of concentrated sulfuric acid, subsequently neutralizing the sulfuric acid and reacting on the condensation product thus formed which contains a free position ortho to the phenolic hydroxyl group, with formaldehyde and a strongly basic non-aromatic amine having less than seven carbon atoms.

10. A condensation product of formaldehyde, a strongly basic, non-aromatic amine having less than seven carbon atoms, and a phenol possessing a free position ortho to the phenolic hydroxyl group and having the general formula X—R—OH in which R is an aromatic nucleus and X is a monovalent hydrocarbon radical having more than three carbon atoms, said condensation product being an organic base soluble in dilute aqueous acetic acid and forming soap-like solutions which foam readily on shaking.

11. A condensation product of formaldehyde, a strongly basic, non-aromatic secondary amine having less than seven carbon atoms and phenylphenol, said condensation product when pure being a crystalline compound readily soluble in dilute aqueous acetic acid and forming soap-like solutions which foam readily on shaking.

12. A condensation product of formaldehyde, a strongly basic, non-aromatic secondary amine having less than seven carbon atoms and an alkylphenol having more than three carbon atoms in the alkyl group, and possessing a free position ortho to the phenolic hydroxyl group, said condensation product being readily soluble in dilute aqueous acetic acid and forming soap-like solutions which foam readily on shaking.

13. A condensation product of substantially one mol. each of formaldehyde, dimethylamine and $\alpha,\alpha,\gamma,\gamma$-tetramethylbutylphenol, said condensation product when pure being a colorless crystalline substance melting at 69° C. and dissolving in dilute aqueous acetic acid to form soap-like solutions which foam readily on shaking.

14. A condensation product of substantially one mol. of $\alpha,\alpha,\gamma,\gamma$-tetramethylbutylphenol and two mols. each of formaldehyde and dimethylamine, said condensation product when pure being an almost colorless oil boiling at 157–160° C. at 1 mm. mercury pressure, and dissolving in dilute sulfuric acid to form a soap-like solution which foams readily on shaking.

15. A condensation product of $\alpha,\alpha,\gamma,\gamma$-tetramethylbutylphenol, formaldehyde and a strongly basic, non-aromatic secondary amine, said condensation product being a viscous pale yellow oil readily soluble in dilute aqueous acetic acid to form soap-like solutions which foam readily on shaking.

16. A condensation product of formaldehyde, a strongly basic non-aromatic secondary amine, and an alkyl phenol in which the alkyl group is a nuclear substituent containing more than five carbon atoms, and in which a free position ortho to the phenolic hydroxyl group is present, said condensation product being soluble in dilute aqueous phosphoric acid to form soap-like solutions which foam readily on shaking.

17. The process for preparing bases, the water soluble salts of which have soap-like properties, comprising reacting on $\alpha,\alpha,\gamma,\gamma$, tetramethylbutylphenol with at least an equimolecular amount of formaldehyde and at least an equimolecular amount of a strongly basic, non-aromatic secondary amine.

18. The process for preparing bases, the water soluble salts of which have soap-like properties, comprising reacting on $\alpha,\alpha,\gamma,\gamma$, tetramethylbutylphenol with at least an equimolecular amount of formaldehyde and at least an equimolecular amount of dimethylamine.

19. The condensation product of $\alpha,\alpha,\gamma,\gamma$, tetramethylbutylphenol, formaldehyde, and a secondary amine of the group consisting of di-methylamine, di-ethylamine, methylethylamine, dipropylamine, di-isopropylamine, di-ethanolamine, piperidine and piperazine.

HERMAN A. BRUSON.